(12) United States Patent
Byerley

(10) Patent No.: US 6,602,372 B1
(45) Date of Patent: Aug. 5, 2003

(54) METHOD AND APPARATUS FOR CONTROL OF DUAL COLLAPSIBLE MANDRELS

(75) Inventor: Mark S. Byerley, Greenback, TN (US)

(73) Assignee: Wyko, Inc., Greenback, TN (US)

( * ) Notice: Subject to any disclaimer, the term of this patent is extended or adjusted under 35 U.S.C. 154(b) by 0 days.

(21) Appl. No.: 09/716,676

(22) Filed: Nov. 20, 2000

(51) Int. Cl.[7] ............ B29D 30/24; B29D 30/36
(52) U.S. Cl. ............ 156/133; 156/135; 156/398; 156/415
(58) Field of Search ............ 156/123, 133, 156/131, 135, 398, 403, 414, 415, 416, 417

(56) References Cited

U.S. PATENT DOCUMENTS 5,223,074 A * 6/1993 Miyanaga et al. .......... 156/398
5,254,204 A * 10/1993 Miyanaga et al. .......... 156/401

FOREIGN PATENT DOCUMENTS

DE 4416514 A1 * 11/1994
JP 57-212046 A * 12/1982 ............ 156/416

\* cited by examiner

Primary Examiner—Geoffrey L. Knable
(74) Attorney, Agent, or Firm—Pitts & Brittian, P.C.

(57) ABSTRACT

A method and apparatus providing for minimization of the separation of a plurality of radially collapsible, generally circular, mandrels which are mounted for axial movement along the longitudinal axis of a central shaft. The method and apparatus is useful for shaping of a green vehicle tire carcass employing a shaping drum which includes dual mandrels which are axially displace able along the longitudinal axis of the drum and adapted to engage respective ones of first and second beads of the carcass.

14 Claims, 4 Drawing Sheets

METHOD AND APPARATUS FOR CONTROL OF DUAL COLLAPSIBLE MANDRELS

BACKGROUND OF INVENTION

In the manufacture of vehicle tires, one process operation includes disposing a cylindrical green carcass on a shaping drum and inflating the carcass to a desired generally toroidal shape. Commonly, the carcass includes inextensible beads (which include respective bead rings) adjacent each of its opposite ends. In a tire-shaping operation, the carcass is positioned about first and second generally circular mandrels with the beads engaged in air-tight sealing relationship by respective ones of the mandrels. These mandrels are mounted in spaced apart relationship on a central shaft for simultaneous movement laterally along the axis of the shaft and toward or away from one another to, among other things, permit narrowing of the axial spacing between the two mandrels, particularly in the course of radial expansion of the carcass. The mandrels of the prior art include rigid unitary mandrels and mandrels whose circumference is changeable. In those instances where the mandrels are intended to expand and retract between radially outward and inward positions, each mandrel is formed of a plurality of segments, (interchangeably referred to herein and in the art as "shoes") the sum of whose radially outermost surfaces define a substantially continuous circular outer surface (circumference) which engages a respective bead ring of the carcass. The outer circumference of each mandrel commonly includes a circular elastic band or bladder (may be inflatable) disposed between the outer circumference of the mandrel and a respective bead of a green tire carcass. Once a carcass is in place about the two mandrels, the bladder may be inflated to initially form an air-tight seal between the outer circumference of each mandrel and its respective bead of the tire carcass. Thereafter, pressurized air is introduced into the region between the spaced apart mandrels to expand the tire carcass radially outwardly to shape the carcass into a tire. As the carcass is expanded, the mandrels are moved axially of the central shaft toward one another, thereby positioning the bead rings apart from one another by a distance which defines the desired width of the tire.

As noted, the two mandrels of each device need to be adjustable laterally of each other to narrow or widen the space therebetween. Initially the mandrels must be spaced apart by a distance appropriate to establish engagement of the mandrels with respective ones of the bead rings of the cylindrical carcass to thereby accept different width carcasses (for different width tires) on the same shaping drum. Thereafter, the mandrels must be moved toward one another as the carcass is radially expanded. These movements of the mandrels have been accomplished heretofore by securing each mandrel on respective opposite ends of common shaft which is provided with left and right-hand threads on opposite ones of its ends. Rotation of this shaft repositions the mandrels laterally relative to one another.

The circumferences of the two spaced apart mandrels of a shaping drum must initially be, and must remain both individually and uniformly circular and uniform in diameter (circumference) relative to one another at all positions of the mandrels along the central shaft. Failure in this respect results in non-uniformity in size and/or diameter of the rims of tires formed on such mandrels. Further, the dual mandrels must remain oriented with their respective planes normal to the longitudinal axis of the central shaft so that the mandrels remain parallel to one another, i.e., canting of a mandrel is not acceptable. Tires exhibiting the defects associated with any of these malfunctions of the mandrels must be discarded. Obviously, this results in substantial losses in time and money for the tire manufacturer.

Dimensional and spatial uniformity of the mandrel circumferences of the mandrels of prior art shaping drums generally has been a problem. In particular in the manufacture of vehicle tires of reduced width, these prior art shaping drums have been found to be substantially incapable of repetitively producing the desired dimensionally and spatially uniform rims on such reduced-width tires. In the prior art shaping drums which employ some version of a multi-segmented mandrel, control over the radial movements of the individual ones of the segments has required extensive mechanical mounting mechanisms which occupy space and limit such prior art mandrels to use in the manufacture of those tires which are wide enough to permit the interposition of the voluminous mechanical mechanisms heretofore required in these drums. This shortcoming of the prior art mandrels preludes spatial positioning of the mandrels relative to one another sufficient to allow these mandrels to accept the more narrow width tire carcasses. Mere shortening of the prior art mounting sleeves for slidably mounting of the mandrels on their central shaft has been attempted, but has resulted in unacceptable in stability of the mounting to the extent that the mandrels canted relative to the central shaft and their circumferences and/or beads could not be maintained dimensionally and/or spatially correct.

It is therefore an object of the present invention to provide a reduced width, radially adjustable, tire shaping drum.

It is another object of the present invention to provide a tire shaping drum having dual radially-adjustable mandrels which are laterally adjustable toward each other on a common shaft to a minimum separation distance between such mandrels.

It is another object to provide enhanced stability of, hence enhanced dimensional and spatial uniformity of the circumferences of, radially adjustable plural mandrels slidably disposed on a common shaft for movement toward a minimized separation distance therebetween.

SUMMARY OF INVENTION

Figure 1:
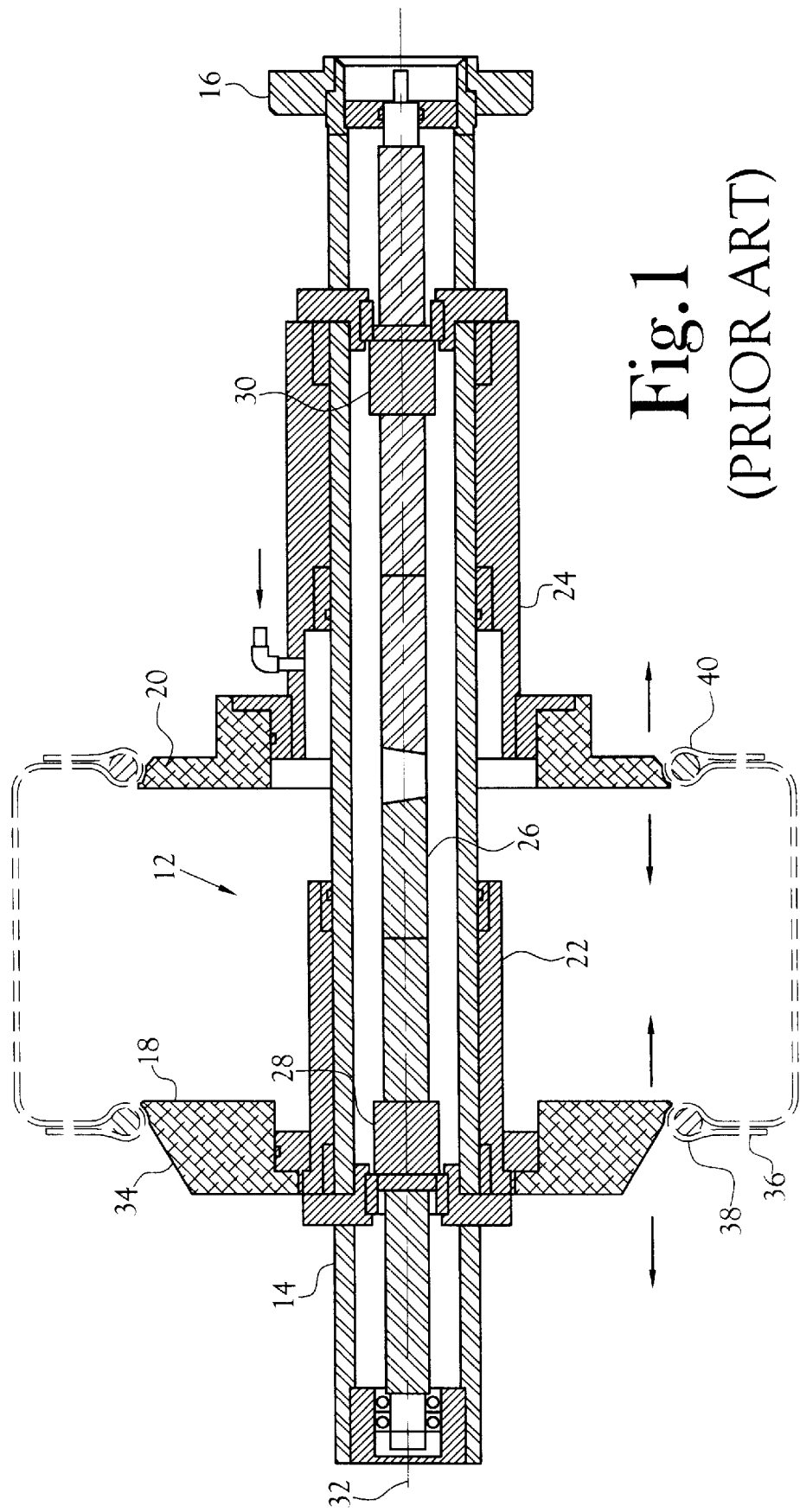
FIG. 1 is a side view, in section, of one embodiment of a prior art shaping drum having limited axial adjustability of the spacing between the mandrels thereof.

In one aspect of the present invention there are provided at least two generally circular mandrels which are axially slidably mounted on a common central shaft for axial movement of the mandrels along the central shaft between maximum separation and minimum separation locations along the longitudinal axis of the central shaft, such minimum separation distance being on the order of about 7 inches in one embodiment. The mandrels of the present invention are also stable at their maximum separation distance, hence are equally useful in the manufacture of wider tires such as are common in the industry.

In one embodiment of the present invention, each mandrel includes a plurality of segments which are aligned in a plane that is normal to the centerline of the common shaft. Each segment is slidably mounted for radial movement thereof, within the plane of the mandrel, between expanded and retracted positions relative to the common shaft. Each segment is constrained to a radial path, and importantly, all segments of a given mandrel move simultaneously radially outwardly or inwardly at the same rate and to the same total extent of radial movement thereof. This is accomplished in accordance with one aspect of the present invention by interconnecting each segment of a given mandrel to all other segments of the given mandrel by means of a rigid connector cam follower that extends from each segment through a respective radial guide slot in an annular guide plate which in fixed relative to a respective one of a plurality of helically oriented camming slots disposed in one flat surface of a limited rotatable scroll ring that is mounted concentrically about the central shaft of the shaping drum and rotatable about the central shaft within limits. Recalling that the segments are constrained to only radial movement relative to the common shaft, by reason of the physical interconnection between the segments, the guide plate and the scroll ring, via the rigid connector cam follower and camming slots, any radially outward or radially inward movement of any one segment produces a like and equal outward or inward radial movement of every other segment of the given mandrel. Effectively, the scroll ring "floats" in its concentric position relative to the common shaft as a function of the position of any one of the segments so that if any one of the segments is moved radially in either the inward or outward direction, such movement is duplicated by all others of the segments which are interconnected to the scroll ring.

In a preferred embodiment of the present invention, radial movement of the segments is effected by means of pressurized fluid, particularly air, acting within a piston/cylinder arrangement that is incorporated into each mandrel. Use of a common source of pressurized air for operation of the piston-cylinders of the two mandrels of a shaping drum also ensures substantially simultaneous like and equal expansion or retraction of the segments of the two mandrels.

In accordance with one embodiment of the method of the present invention, there are provided first and second laterally moveable circular mandrels disposed in substantially parallel spaced apart planes and concentrically of a common shaft. A green tire carcass which includes a bead ring adjacent each of its opposite ends is disposed in encircling relationship to the two mandrels one bead of the tire carcass on the shaping drum is located adjacent to, and encircling, the outer circumference of one of the mandrels and the other of the two beads is located adjacent to, and encircling, the outer circumference of the second of the mandrels. When so positioned, the outer circumferences of the two mandrels are adjusted into air-tight sealing engagement with their respective beads and pressurized fluid is admitted to the space between the two mandrels to inflate the tire carcass radially outwardly of the drum. As the carcass is inflated, the mandrels are simultaneously moved toward one another by equal distances to thereby move the bead rings of the carcass axially to that spaced apart distance which represents the desired final width of the tire being formed.

DETAILED DESCRIPTION OF INVENTION

With reference to the prior art tire shaping drum depicted in FIG. 1, the drum 12 includes a central shaft 14 which is affixed at one of its ends 16 to the drive shaft of a conventional drive unit (not shown) whereby the central shaft 14 may be rotated upon rotation of the drive shaft. First and second circular solid mandrels 18,20 are mounted on the central shaft 14 at spaced apart locations along the length of the central shaft. Each mandrel is slidably mounted on the central shaft as by a respective sleeve 22,24 that encircles the central shaft and is slidable along the length of the central shaft. Axial movement of each mandrel along the central shaft may be effected by means of a left-handed and right-handed lead screw 26 whose rotation acts through first and second lead nuts 28,30 that are secured to respective ones of the first and second mandrels, to move the mandrels simultaneously axially toward or away from one another.

The sleeve 22,24 each of the prior art mandrels depicted in FIG. 1 is elongated and slidably mounts a respective mandrel for axial movement along the central shaft. Each such sleeve is of a substantial length such that its respective mandrel is maintained within a plane normal to the axis 32 of the central shaft even though there is considerable axial force applied to the mandrel adjacent the outer circumference 34 (for example) thereof as a tire carcass 36 mounted on the mandrels is radially inflated and stretched into a desired toroidal shape. In this shaping of a tire the beads 38,40 of the carcass are locked about the circumference of respective ones of the mandrels and the area between the mandrels and the encircling carcass is pressurized with a fluid (e.g. pressurized air). It is imperative that the outer circumferences of the two mandrels remain radially equidistant from the central shaft and within parallel planes with respect to one another. Otherwise the beads of the resulting tire become non-uniformly disposed radially and/or axially of one another and the resulting tire is "off-center" so that it is unusable, such as on a vehicle traveling at highway speeds. The forces experienced by the mandrels at their respective circumferences are enormous, hence the need for their respective mounting sleeve to be of sufficient length as will prevent any material canting movement of a mandrel out of its plane normal to the central shaft. The mandrels of this type prior art shaping drum, because of the required length of each sleeve, are incapable of being moved sufficiently axially close to one another as will permit the shaping drum to accommodate certain of the modern narrow width vehicle tires.

Figure 2:
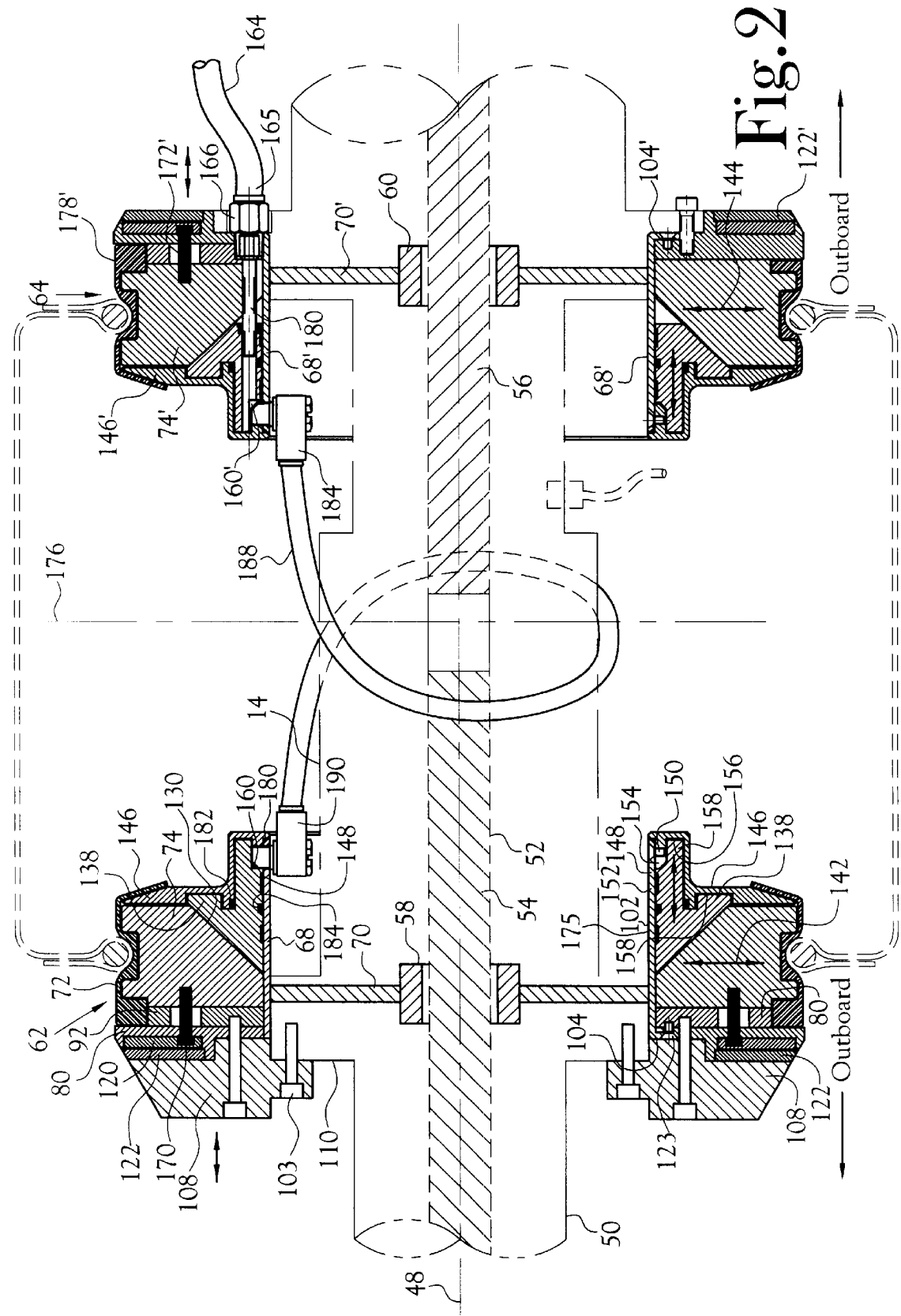
FIG. 2 is a side view, partly in phantom, and partly in section, of one embodiment of a shaping drum embodying various of the features of the present invention.

In accordance with the present invention, one embodiment of which is depicted in FIG. 2, there is provided a central shaft 50 (depicted in phantom) having a longitudinal (rotational) axis 48 which is mountable to a drive unit (not shown) of the type, and in a manner, well-known in the art. The depicted central shaft 14 is hollow and houses therein a rotatable lead screw 52 having left-handed threads on one end 54 thereof and right-handed threads on the opposite end 56 thereof. This lead screw is rotatable independently of the central shaft and may be actuated from a location externally of the central shaft as is well known in the art. Lead nuts 58 and 60 are mounted on opposite ends of the bi-threaded lead screw and further attached to respective ones of first and second generally circular mandrels 62,64 which are mounted for slidable axial movement along the central shaft. Rotation of the lead screw 52 functions through the lead nuts to simultaneously move the mandrels toward or away from one another axially of the central shaft. By this means, which is known in the art, the mandrels may be positioned apart from one another those distances, (initial, intermediate and/or final) which are appropriate for the formation of a given width vehicle tire. In this operation, the width of the tire is taken as the distance between the beads of the formed carcass.

As further depicted in FIGS. 2–7, the present invention includes first and second mandrels 62,64, respectively, each of which is generally of a ring geometry. Each mandrel encircles and is slidably mounted on the outer circumference 66 of the central shaft 50, through the medium of the sleeve 68,68' which encircle the central shaft and are disposed between the mandrel and the central shaft, thereby being slideably axially positionable along at least a portion of the length of the central shaft. By reason of the interconnection of these two mandrels via the lead nuts 58 and 60 and spiders 70,70' to the bi-directionally threaded lead screw 52, these two mandrels are constrained to simultaneous and equal axial movement toward or away from one another upon rotation of the lead screw 52.

Figure 3:
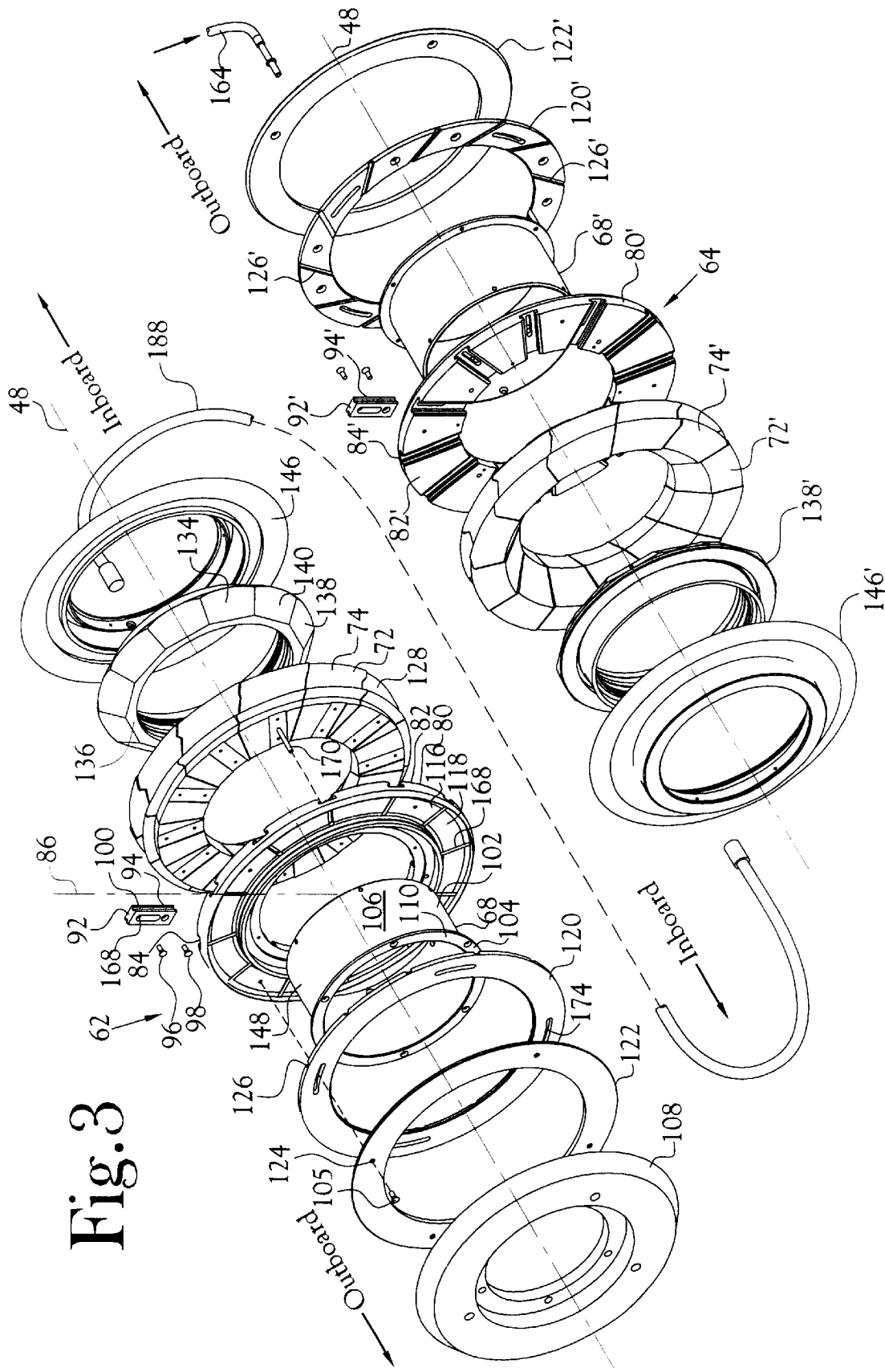
FIGS. 3 is an exploded representation of first and second mandrels, respectively, employed in a shaping drum in accordance with the present invention.
Figure 4:
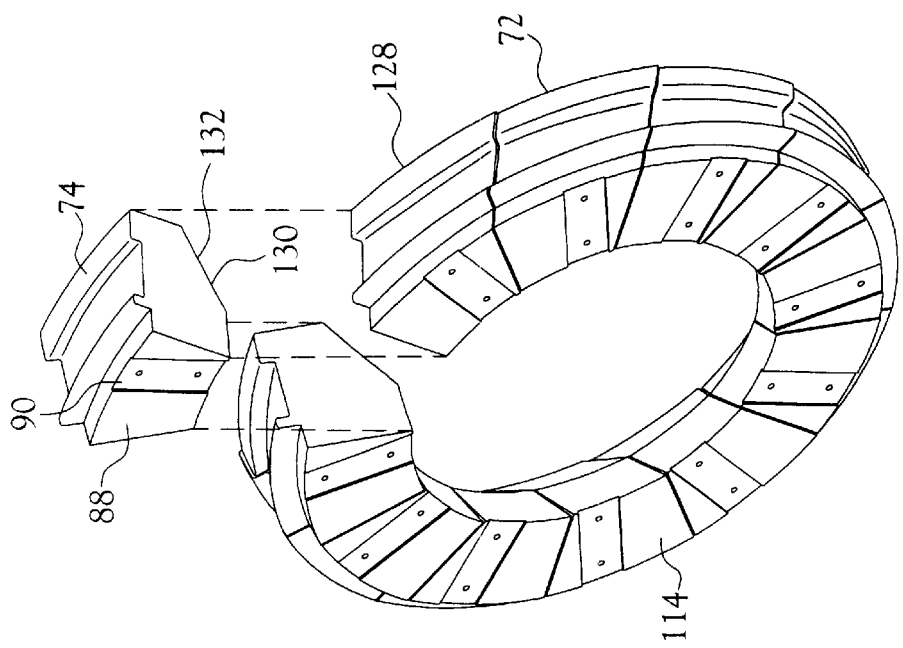
FIG. 4 is a representation of a radially expandable and retractable bead lock ring defined by a plurality of radially displace able shoes in accordance with one feature of the present invention and depicting a single shoe displaced relative to its in use position within the depicted ring.
Figure 6:
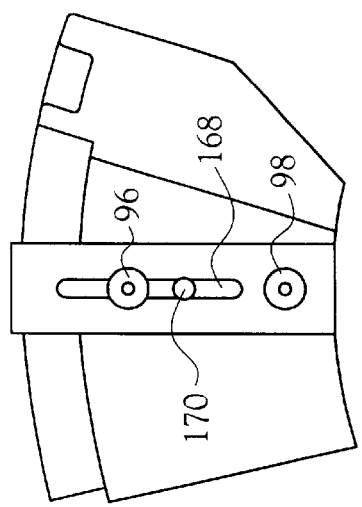

Each of the first and second mandrels 62,64 includes a bead ring 72,72', respectively, which is defined by a plurality of spatially cooperating shoes (segments) 74,74'. Referring to the first mandrel 62 depicted in exploded view in FIG. 3 and in FIGS. 2, and 4–7, the shoes 74 of a first bead ring 72 of this first mandrel (twelve shoes in number in the depicted embodiment) are individually mounted for sliding radial movement toward or away from the central (rotational) axis 48 of the central shaft 50. In the depicted embodiment, this mounting is effected by means of a guide flange 80 of a generally flat ring geometry. That face 82 of the guide flange facing the bead ring is provided with a plurality of slots 84 of a "T" cross-section, each slot opening outwardly of the face 82 of the guide flange and being oriented along a radius 86 of the guide flange, hence along an extended radius of the central shaft. In similar manner, that face 88 of each shoe which faces the guide flange when the shoe is assembled in a bead ring as depicted in FIG. 3, is provided with a like slot 90 of "T" cross-section as the slots 84 in the face of the guide flange. These slots 90 open outwardly of the face 88 of respective shoes and are oriented along an extended radius of the central shaft. A double "T" guide key 92 is provided which includes a first side 94 thereof configured to slidably enter the "T" slot 90 in the face 88 of each shoe 74 where it is secured in place as by flat head screws, 96,98 for example. When the mandrel is assembled, the second side 100 of the double "T" guide key associated with a shoe slidably resides within one of the "T" slots 84 in the face of the guide flange, thereby mounting each shoe for radial sliding movement toward or away from the axis of the central shaft.

With particular reference to FIGS. 2 and 3, the first 62 of the first and second mandrels further includes a hollow cylindrical sleeve portion 102 having a radial flange 104 projecting outwardly from one end 104 of the sleeve portion and an outer circumferential outer surface 106. As noted hereinafter, the mandrel 62 further includes a plurality of components which individually encircle at least some portion of the sleeve and are mounted thereon. As depicted in FIGS. 2 and 3, an outboard mounting plate 108 is affixed to the outer face 110 of a flange 104 on the central shaft 50 as by bolt 103 and serves to mount the shaping drum to an existing support (not shown).

The first bead ring 72 as described herein above is freely rotatably mounted on the outer circumference 106 of the sleeve 102. The outboard face 114 of this bead ring matingly abuts the inboard face 82 of the guide flange 80, which is provided on its outboard face 116 with a circular recess 118 which, in turn, receives therein a scroll ring 120. The scroll ring is retained (with limited rotational movement) within the circular recess of the guide flange as by means of a circular retainer plate 122 which is affixed to the guide flange 80 as by screws or the like 123 (FIG. 2) which extend through holes 124 provided through the thickness of the retainer plate and which extend through respective registered slots 174 through the thickness of the scroll ring, and thence are anchored in the guide flange 80. By this means, the scroll ring is permitted to rotate within its recess 118 within the limits of the length of the slots 126.

The inboard face 128 of the bead ring 72 includes a circumferential camming surface 130 which is collectively defined by the inboard surfaces 132 of the plurality of shoes 74 that make up the bead ring 72. Each of these inboard surfaces 132 is disposed at an angle of approximately forty-five degrees relative to the longitudinal axis 48 of the central shaft.

A further camming surface 134, defined on the outboard face 136 of a circular piston 138 by a plurality of integrally formed segments 140, is received in matingly relationship with the camming surface 130 on the bead ring 72. This piston 138 is axially movable toward and away from the bead ring 72. Movement of the piston toward the bead ring exerts a camming action against the shoes 74 of the bead ring causing the shoes to move radially outwardly from the central shaft of the drum. These movements are indicated by the arrows 142 and 144 of FIG. 2.

A circular rear flange 146 also encircles the sleeve adjacent the inboard end 148 of the sleeve 102 and is affixed thereto (see FIG. 2) as by flat head screws 150, or the like, which extend from the inner wall of the sleeve, through the thickness of the sleeve and engage an annular flange 154 defined on the rear flange 146 (see FIG. 2). Further, the rear flange includes an annular depression 156 in the outboard face 158 thereof within which there is slidably received an annular flange portion of the piston 138 (see FIG. 2). Between the sleeve 102 and the piston 138 there is defined an annular cavity 160 at a location inboard of the inboard face of the piston 138. As depicted in FIG. 2, an air line 164 leads through a fitting 166 into a cavity 160' in the second flange 74, thence through an air line 188, thence through a fitting 190 to provide pressurized air within the cavity 160 for urging the piston 138 in a direction axially outboard of the mandrel 62 for exerting a camming action by the piston 138 against the shoes 74 of the bead ring 72 and resultant radial movement of the shoes 74 in response thereto. As noted, each shoe is constrained to radial movement relative to the central shaft as by the double "T" guide keys which mount the shoes within the mandrel.

With reference to FIGS. 2–7, each shoe 74 of the bead ring 72 receives a double "T" mounting guide key 92 affixed thereto. Each such mounting guide key includes an elongated slot 168 that extends through the thickness of the guide key. A rigid connector, e.g., a dowel 170 having one of its ends 172 secured in a shoe projects from the inboard face 88 of the shoe, through a registered one of the slots which extend through the thickness of the guide flange and terminates with its opposite end disposed in sliding (camming) engagement with a registered one of the non-radial slots defined in the outboard face of the scroll ring.

Figure 7:
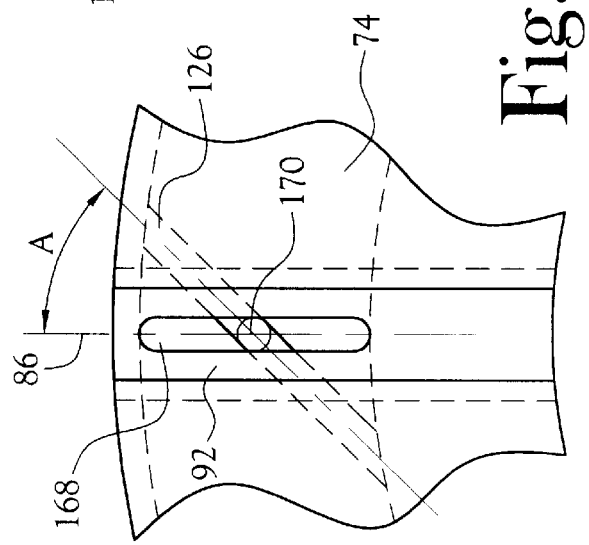
FIG. 7 is a partial side elevation view of a shoe and depicting the relative movement of various components associated with the shoe.
Figure 5:
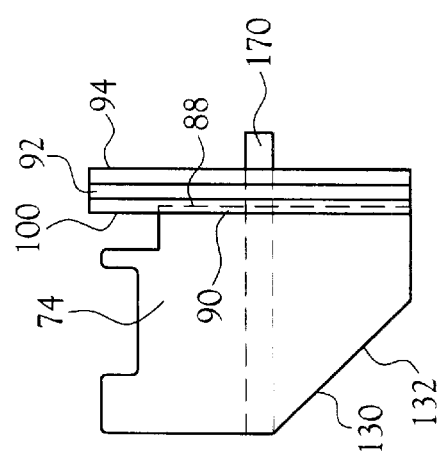
FIG. 5 is an end elevation view of a shoe of the ring depict ed in FIG. 5 and further depicting a mounting guide key associated with the shoe; and, FIG. 6 is a side elevation view of the shoe depicted in FIG. 5.

FIG. 7 depicts the relationship of the dowel 170, the radial slot 168 through the guide key 92, the slot 84 through the guide flange 80, and the non-radial, i.e. arcuate, slot 126 defined in the scroll ring 120. Referring to FIGS. 3 and 4–7 in particular, it will be recognized that movement of a given shoe radially of the drum is permissible by reason of the double "T" mounting guide key 92. Such radial movement of the shoe is accommodated by the radial orientation of the slot through the guide flange and the dowel disposed within such slot. However, because the dowel extends to engagement with the non-radial slot defined in the scroll ring, which is restricted to limited rotational movement within its recess by the arcuate slots 126 of the scroll ring 120, any radial movement of a shoe is translated into rotational movement of the scroll ring. Recalling that all of the shoes are interconnected with the scroll ring and therefore are thereby constrained in their movement, that is, all the shoes of a given bead ring are "locked together" to the extent that all such shoes of a given mandrel must move in the same direction, at the same time, and to the same extent, any rotation of the scroll ring by reason of the radial movement of any one or more of the shoes results in substantially simultaneous and substantially equal radial movement of all of the shoes. Likewise, simultaneous radial movement of all of the shoes by the camming action imparted to the bead ring by the piston is translated through the scroll ring into simultaneous and like radial movement of all of the shoes.

Thus, the first mandrel of the present shaping drum is condensed into a relatively limited axial distance (i.e., thickness), hence requires a relatively short sleeve for the mounting of the mandrel on the outer circumference of the central shaft. This minimization of the axial space occupied by each mandrel is in substantial part made possible by the feature of interlocking the radial movement of the plurality of shoes of the bead ring of a mandrel employing the combination of the "floating" scroll ring with its series of non-radial slots within which there reside respective ends of the rigid connectors (dowels) that are affixed to respective ones of the shoes and which are constrained to radial movement as the shoes are moved radially whereby the radial movement of any shoe is converted to rotational movement of the scroll ring which, in turn, converts to substantially simultaneous and like radial movement of all the shoes. As noted, the control over the radial movement of the shoes is constrained to radial movement by means of the mounting of the shoes to their respective guide flange. By means of the rigid dowels 170 which pass through the radial slots 168 through the thickness of the guide flange, this radial movement of each shoe is transmitted to the non-radial slots 126 of the scroll ring. Further, the engagement of the dowels with respective camming non-radial slots in the face of the scroll ring interconnect all of the shoes and constrain these shoes to substantially simultaneous and equal radial movement. Notably also, the radial force applied by the camming surface of each piston against the shoes of its respective bead ring is exerted in a direction axially outwardly from the perpendicular centerline 176 of the drum. In this manner, the piston provides both the force to urge the shoes radially outwardly and, importantly, a further force which tends to oppose any force exerted at the circumference of a mandrel and which tends to urge the mandrel out of its desired perpendicular attitude with respect to the longitudinal axis of the central shaft, hence its concentricity and parallelism with respect to the other of the two mandrels. Moreover, the compactness of the multiple components of each mandrel of the present invention serves to rigidify the mandrels (while still providing for the desired relative movements of select ones of these components) and thereby enhance the resistance of the mandrels to deviate from their desired perpendicular attitude relative to the central shaft.

In a preferred embodiment, each of the non-radial slots 126 in the face of a scroll ring 120 are oriented at an angle "A" (FIG. 7) of substantially forty-five degrees relative to an extended radius of the drum. However, this angle may be selected to between about 40 degrees and about 50 degrees, with proper sizing of the various slots, etc., without material loss of operability of the present invention.

It will be recognized by one skilled in the art that the feature of interlocking the radial movement of the plurality of shoes of the bead ring of a mandrel employing the combination of the "floating" scroll ring with its series of non-radial slots within which there reside respective ends of the rigid connectors that are affixed to respective ones of the shoes and which are constrained to radial movement as the shoes are moved radially, may be alternatively accomplished by repositioning the scroll ring on the opposite side of the shoes as that depicted in the Figures, fixing the guide key relative to radial movement of the shoe, mounting the dowel 170 in the rear flange 146 or other fixed (non-rotatable) ring, and altering the location and orientation of the slots 168 and 126 to effect substantially the same result of converting radial movement of any shoe to rotational movement of the scroll ring, and substantially simultaneous and like radial movement of all of the shoes.

Retraction of the shoes of the bead ring is accomplished in the depicted embodiment by means of an elastic band 178 which encircles the circumference of the bead ring and which is stressed toward minimization of the circumference of the bead ring, i.e., radially inward positioning of the shoes of the bead ring.

As depicted in FIG. 2, the piston 138 of each mandrel is slidable with respect to the outer circumference of its respective sleeve 102 and rear flange 146. Airtight engagement of the piston and its sleeve is provided for as by means of "O"-rings 180,182,184. Further, in the depicted embodiment, a substantially incompressible lubricative band 185 is provided in encircling relationship to the outer circumference of the sleeve 102 and the inner circumference of the piston 138. Preferably two such bands are provided to aid in preventing canting of the sleeve relative to the outer circumference of the sleeve.

The second mandrel 64 of the present invention (see FIGS. 2 and 3) is substantially a mirror image of the first mandrel 62, with the exception that the second mandrel does not include an outboard mounting flange. In the several Figures, primed numerals are used to indicate like components of the second mandrel to the components of the first mandrel.

In the depicted embodiment (See FIGS. 2 and 3), pressurized fluid, e.g. air, for activation of the pistons of the first and second mandrels is initially admitted to the second mandrel 64 via a line 164 leading from a source of pressurized fluid (not shown) and having its inboard end 165 connected in fluid communication with the cavity 160' via a conventional inlet fitting 166 disposed in the rear flange 146' of the second mandrel 74 and a flow pipe 180 which leads from the inlet fitting to the cavity 160' of the second mandrel. The cavity 160' of the second mandrel is connected in fluid flow communication with the cavity 160 of the first mandrel as by an outlet fitting 184 provided in the inboard face of the rear flange 146' of the second mandrel and a fluid flow line 188 leading from the outlet fitting 184 to an inlet fitting 190 mounted in the rear flange 146 of the first mandrel 62. This inlet fitting 190 in the first mandrel is in direct fluid flow communication with the cavity 160 of the first mandrel so that any pressurized fluid admitted to the cavity 160' of the second mandrel 64 is substantially simultaneously and equally expressed in the cavity 160 of the first mandrel. Release of the pressurized fluid may be accomplished by any of several known means disposed external of the drum, such as a simple release valve, for example.

As noted, axial movement of the first and second mandrels toward or away from one another may be effected as by the means of a bi-directionally threaded lead screw 52 and accompanying lead nuts 28 and 30, each of which is rigidly secured, as by respective spider mounts 70,70' to the inner wall of a respective one of the sleeves which mount the first and second mandrels on the central shaft. The central shaft, the bi-directionally threaded lead screw and accompanying ball nuts are of conventional construction and are depicted in phantom in the accompanying drawings.

Recalling that in accordance with the present invention a green tire carcass is initially in the form of a relatively straight hollow cylinder with its beads disposed adjacent the opposite ends of the carcass, one embodiment of the present method for the shaping of a green vehicle tire carcass employing a shaping drum which includes dual mandrels which are axially displace able along the longitudinal axis of the drum and adapted to engage respective ones of the first and second beads of the carcass, comprises defining each mandrel to include a plurality of shoes which collectively define an outer circumference of the mandrel that is adapted to engage a bead of the carcass, constraining each of said shoes to movement along a radius of the drum, physically interconnecting all of the shoes of each mandrel, converting radial movement of said shoes into rotational movement, transmitting said rotational movement to all of said shoes and converting said transmitted rotational movement into radial movement of all of the shoes whereby any substantial radial movement of any one of the shoes is transmitted to every other of the shoes of the mandrel and all the shoes are constrained to move substantially simultaneously in like direction and like extent of movement.

Whereas the present invention has been described with specific reference to the accompanying drawings, it is intended that the invention be limited only as set forth in the claims appended hereto.

What is claimed:

1. In a method for the shaping of a green vehicle tire carcass employing a shaping drum which includes dual mandrels mounted on a rotatable shaft, each of which includes a plurality of shoes collectively defining an outer circumference of each of the mandrels that is adapted to engage a bead of the carcass, and each of which is axially displaceable along the longitudinal axis of the drum, the improvement comprising the steps of:

constraining each of said shoes of each mandrel to movement of individual ones of the shoes directionally along a radius of the drum, physically interconnecting all of the respective shoes of each mandrel, applying a single axially oriented force substantially simultaneously to all of the shoes of respective ones of the mandrels, whereby the shoes of each mandrel are substantially simultaneously moved radially of the drum, mechanically converting said radial movement of each of the shoes into a corresponding rotational force, transmitting said corresponding rotational forces associated with the shoes of a respective mandrel substantially simultaneously to each of the other shoes of the respective mandrel, whereby any substantial radial movement of any one of the shoes of a respective mandrel is transmitted to every other of the shoes of the respective mandrel, and all of the shoes of the two mandrels are caused to move substantially simultaneously in like direction and like extent of movement as a consequence of said single axially applied force, thereby uniformly shaping the carcass.

2. In the method according to claim 1 wherein said single axially oriented force comprises applying a pressurized fluid from a single source substantially simultaneously to each of the mandrels.

3. In a method for converting a generally hollow cylindrical green tire carcass into a generally toroidal tire employing a shaping drum having a rotatable central shaft having a rotational axis and first and second mandrels mounted on the shaft, each of the mandrels being divided into a plurality of like segments constrained to radial movement relative to the rotational axis of the shaft and defining an outer circumference for the receipt thereon of a bead ring of the carcass when disposed on the shaping drum, comprising the steps of defining a camming surface on each of the segments of each of the first and second mandrels, said camming surfaces of each mandrel facing respectively inboard of said drum and collectively defining respective common circular areas for camming engagement therewith of first and second circular cams axially and slidably disposed on the shaft and inboard of said camming surfaces of the segments, applying an axially directed force from a single source thereof substantially simultaneously to each of said circular cams to thereby move each of said circular cams into camming engagement with respective ones of said camming surfaces of the segments to substantially simultaneously urge each of the segments of each mandrel radially outwardly of the drum, substantially simultaneously converting said radial movement of each of the segments into respective rotational forces, substantially simultaneously transmitting said rotational forces associated with each of the segments of the first mandrel to all of the other segments of the first mandrel and transmitting said rotational forces associated with the segments of the second mandrel to all of the other segments of the second mandrel, whereby all of the segments of each of the first and second mandrels move substantially simultaneously in a like direction and to a like extent to uniformly shape said carcass.

4. The method of claim 3 including the steps of pinning each of said shoes of each mandrel to a scroll ring having a plurality of open face non-radial slots, at least one slot for each of the shoes, disposed generally concentrically of and substantially parallel to each mandrel and a guide flange disposed generally concentrically of and substantially parallel to each mandrel and between the shoes and said scroll ring, and having a plurality of radial through slots about and adjacent to the periphery thereof, at least one of said slots being in register with at least one of said open face slots of said scroll ring whereby movement of each shoe of each mandrel is physically translated into movement of like direction and extent as each of all other shoes of their respective mandrel, constraining said scroll ring to limited rotational movement in a plane substantially perpendicular to the longitudinal axis of the drum, and fixing said guide flange to the shaft for rotation of said guide flange with rotation of the shaft.

5. The method of claim 3 and including the step of keying each of the segments of each of said first and second mandrels to a respective guide flange, said key being received within facing radially oriented slots defined in facing surfaces of the segments of a respective mandrel and the guide flange associated with a respective mandrel, said key being fixedly anchored within a radially oriented slot of said mandrel and slidably received within a facing radially oriented slot of said guide flange.

6. A shaping drum having a transverse center plane, for use in the manufacture of vehicle tires wherein a generally hollow cylindrical green tire carcass, which includes a bead adjacent each of its opposite ends, is sealably secured at its beads to the circumferences of respective ones of first and second mandrels that are mounted on opposite sides of the transverse center plane for movement toward and away from one another on a central shaft having a longitudinal rotational axis, and while so sealably mounted, is inflated to enlarge the radial dimension thereof and to reposition the beads thereof to a desired separation distance that is representative of the desired width of the tire comprising first and second generally circular mandrels disposed in encircling relationship to said central shaft, each of which includes a plurality of radially movable segments which define the circumference of said mandrel, each segment including a camming surface facing the transverse center plane of the drum, piston member encircling the central shaft and defining a camming surface on its outboard face, said camming surface on said piston member adapted to engage and apply a camming force substantially simultaneously against the camming surface of each of the segments of a respective one of said mandrels, said force urging said segments radially outwardly from said central shaft, first and second sleeves encircling said central shaft, said first sleeve receiving thereon said first mandrel and said first piston member, said second sleeve receiving thereon said second mandrel and said first piston member, a fluid-tight cavity disposed between said piston member and said sleeve adjacent the inboard side of each of said first and second mandrels, said cavities being connected in fluid flow communication with one another, first and second circular scroll plates encircling the central shaft at respective locations outward of each of said first and second mandrels, each scroll plate having defined in the inboard face thereof a plurality of slots, each of which is oriented non-radially with respect to said central shaft, first and second guide flanges interposed between respective ones of said first and second mandrels and said first and second scroll plates, each of said guide flanges including first and second pluralities of slots which are aligned radially of said central shaft, the slots of said first plurality of slots being blind slots and the slots of said second plurality of slots extending fully through the thickness of its respective guide flange, a rigid connector extending from each of said segments, through a respective one of said second slots of a respective one of said guide flanges, thence to engagement in a respective one of said non-radial slots defined in the inboard face of a respective one of said scroll plates, thereby constraining any material radial movement of any one of said segments of a given mandrel to substantially simultaneous and substantially equal radial movement of all the segments of the given mandrel.

7. The shaping drum of claim 6 and including first and second rear flanges encircling a respective one of said sleeves, respective ones of which are disposed inboard of respective ones of said piston members and said segments of a respective mandrel and having an inboard face defining a section thereof disposed in abutting relationship to said segments and a section thereof defining a depression for the receipt therein of a circular axial flange of said piston member, a fluid-tight seal disposed between said depression and said axial flange of said piston member, and a fluid-tight seal disposed between said piston member and its respective sleeve.

8. The shaping drum of claim 6 wherein each of said plurality of non-radial slots in each of said scroll plates is oriented at an angle of about forty-five degrees with respect to an extended radius of said central shaft.

9. The shaping drum of claim 6 wherein said rigid connector comprises a pin having opposite ends, one end of which is secured relative to a respective one of each of said segments of said first and second mandrels and the opposite end of which is slidably disposed within a respective one of said non-radial slots of a respective one of said scroll plates.

10. Apparatus for converting a generally hollow cylindrical green tire carcass into a generally toroidal tire blank employing a shaping drum having a rotatable central shaft having a rotational axis and first and second mandrels mounted on the shaft, each of the mandrels being divided into a plurality of like segments constrained to radial movement relative to the rotational axis of the shaft and defining an outer circumference for the receipt thereon of a bead ring of the carcass when disposed on the shaping drum comprising first and second guide flanges, said first guide flange circumscribing and being rotationally fixed to the shaft in juxtaposition to said first mandrel and said second guide flange being rotationally fixed to said shaft in juxtaposition to said second mandrel, key means interposed between each of the segments of a respective mandrel and its associated guide flange, said key residing in respective radial slots defined in the faces of the mandrel and slidably residing in respective radial slots defined in a juxtaposed face of its associated guide flange whereby said segments of each mandrel are simultaneously rotatably driven by the shaft while simultaneously being radially positionable relative to the rotational axis of the shaft, each of said guide flanges including a plurality of throughbores disposed circumferentially about the outer margin thereof, and including first and second scroll rings, each of said scroll rings circumscribing and rotational with respect to the shaft and having respective faces facing inboard of the drum and juxtaposed to a respective one of said guide flanges, each scroll ring having defined a plurality of non-radially oriented slots accessible on that face thereof facing its respective guide flange, respective ones of said slots of said scroll ring being in register with respective ones of said throughbores of its respective guide flange, and rigid connector means having a first end anchored within a segment of a respective one of said mandrels and extending therefrom through a throughbore of said guide flange, thence with its opposite and second end engaging a respective one of said slots of a respective one of said scroll rings, thereby physically interconnecting each of said segments of a respective mandrel with a slot in a respective scroll ring to effect substantially simultaneous movement of each of the segments of the respective mandrel in a like direction and extent of movement of every other segment of the respective mandrel.

11. The apparatus of claim 10 and including a first and second circular cams axially and slidably disposed on the shaft and outboard of said respective ones of said mandrels, a camming surface defined on each of the segments of each of the first and second mandrels, said camming surfaces of each mandrel facing respectively inboard of said drum and collectively defining respective common circular areas for camming engagement therewith of a respective one of said first and second circular cams, whereby movement of each of said first and second cams axially outwardly of the drum effects camming engagement thereof with the segments of a respective mandrel and resultant substantially simultaneous radially outward movement of each of the segments of the respective mandrel.

12. The apparatus of claim 11 and including means for applying an axially applied force substantially simultaneously from a single source thereof to each of said first and second cams, whereby said cams substantially simultaneously effect like radial movement of each of the segments of each of the first and second mandrels.

13. The apparatus of claim 11 and including first and second hollow cylindrical sleeves disposed in encircling and axially movable relationship to the central shaft, said first and second sleeves being interposed between respective ones of said first and second mandrels, said first and second cams, said first and second guide flanges and said first and second scroll rings, and the central shaft whereby simultaneous axial movement of a sleeve along the central shaft effects like axial movement of its associated mandrel, cam, guide flange and scroll ring.

14. The apparatus of claim 13 wherein each of said first and second cams comprises a piston, and including first and second rear flanges disposed in encircling relationship to said central shaft, said first and second rear flanges being affixed and fluid flow sealed to a respective one of said first and second sleeves, each of said rear flanges having a circular outboard face which is configured to abut said segments of a respective one of said first and second mandrels and to define therewith a depression having a circular shoulder defined at a location radially spaced from its respective sleeve, for the slidable receipt therein of said circular shoulder of a respective one of said first and second pistons, and at least one fluid flow seal interposed between each of said shoulders of said pistons and respective ones of said depressions, and at least one fluid flow seal interposed between each of said pistons and its respective sleeve, thereby defining a fluid-tight substantially annular cavity at the inboard surface of each of said pistons, and further including a fluid flow inlet to one of said cavities, a fluid flow outlet from said cavity, a fluid flow inlet to the other of said cavities and a fluid flow connector interposed between said fluid flow outlet of said cavity and said fluid flow inlet of said other of said cavities thereby providing for substantially simultaneous expression of an applied fluid pressure within said cavities.

* * * * *